United States Patent [19]

Pronovost et al.

[11] Patent Number: 5,425,221
[45] Date of Patent: Jun. 20, 1995

[54] APPARATUS FOR LOADING FLEXIBLE TUBING WITH BALES

[76] Inventors: Normand Pronovost; Réjean Pronovost, both of St-Tite, Quebec, Canada

[21] Appl. No.: 120,401

[22] Filed: Sep. 13, 1993

[51] Int. Cl.⁶ .................. B65B 11/00; B65B 43/42; B65B 9/10
[52] U.S. Cl. ...................... 53/567; 53/556; 53/585
[58] Field of Search .............. 53/527, 530, 556, 567, 53/575, 576, 585

[56] References Cited

U.S. PATENT DOCUMENTS

| | | |
|---|---|---|
| 3,763,621 | 10/1973 | Klein et al. . |
| 4,050,219 | 9/1977 | Higgins ................. 53/567 |
| 4,442,568 | 4/1984 | Petry . |
| 4,594,836 | 6/1986 | Good ..................... 53/567 |
| 4,606,176 | 8/1986 | Cundall . |
| 4,686,817 | 8/1987 | Brodrecht et al. ........... 53/567 |
| 4,888,937 | 12/1989 | Glenn . |
| 4,938,006 | 7/1990 | Korsgaard . |
| 4,945,715 | 8/1990 | Brodrecht ................. 53/567 |
| 5,003,754 | 4/1991 | Stirling .................. 53/576 |
| 5,012,631 | 5/1991 | Hostetler et al. ........... 53/556 |
| 5,220,772 | 6/1993 | Koskela et al. ............. 53/567 |

FOREIGN PATENT DOCUMENTS

| | | |
|---|---|---|
| 1242173 | 9/1988 | Canada . |
| 2045626 | 5/1991 | Canada . |
| 1302959 | 6/1992 | Canada . |
| 1302989 | 6/1992 | Canada . |
| 2135955 | 9/1984 | United Kingdom ........ 53/576 |

Primary Examiner—John Sipos
Assistant Examiner—Rodney A. Butler
Attorney, Agent, or Firm—Pierre Lespérance; François Martineau

[57] ABSTRACT

Bales of hay or the like vegetable material are successively loaded on the frame of a wheeled vehicle and actuate a trip plate which causes a pusher plate to push the bale into the open ended portion of a long plastic flexible tube held folded on an arch-shaped upstanding holding device secured to the rear end of the vehicle. The bales loaded within the tube successively drop off the vehicle on the ground and react to the backward thrust exerted by the pusher plate on the next bale to cause forward movement of the vehicle. The vehicle carries its own power supply and is therefore entirely autonomous. The vehicle has a skid plate and the wheels can be raised so that the vehicle moves on the skid plate to thereby increase resistance to the vehicle forward movement thereby increasing the compaction of the bales within the tube. The holding device includes a plurality of tube retaining hook members which are carried by an arch-shaped frame for outward diverging linear movement so as to open the tube. The tube, which is preferably of the stretchable type, is stretched by the hook members in a uniform way all around the tube circumference with a minimum of friction on the individual hook members. The apparatus can handle bales and tubings of various diameters.

17 Claims, 8 Drawing Sheets

APPARATUS FOR LOADING FLEXIBLE TUBING WITH BALES

FIELD OF THE INVENTION

This invention relates to an apparatus for automatically and successively bagging bales of agricultural products within a flexible and resilient tube.

BACKGROUND OF THE INVENTION

It is known to load bales of agricultural products such as grass, hay, corn stalks and the like into flexible plastic tubing which are sealed and left on the ground to convert the material into desired silage, thereby eliminating the use of costly silos. Such an apparatus is described, for instance, in Canadian patent 1,242,173 dated Sep. 20, 1988, inventor Maynard Good, entitled: "APPARATUS AND METHOD FOR LOADING PLASTIC TUBING WITH BALES". However, the apparatus of this patent which is mounted on wheels must be hitched to a tractor which carries the power source necessary to actuate the pusher plate which sequentially moves the bales into the open-ended portion of the tube. A driver must therefore be provided for the tractor and apparatus in addition to the driver operating the fork-carrying tractor which collects the bales scattered on the field and sequentially drop the same on the vehicle for loading.

Figure 3:
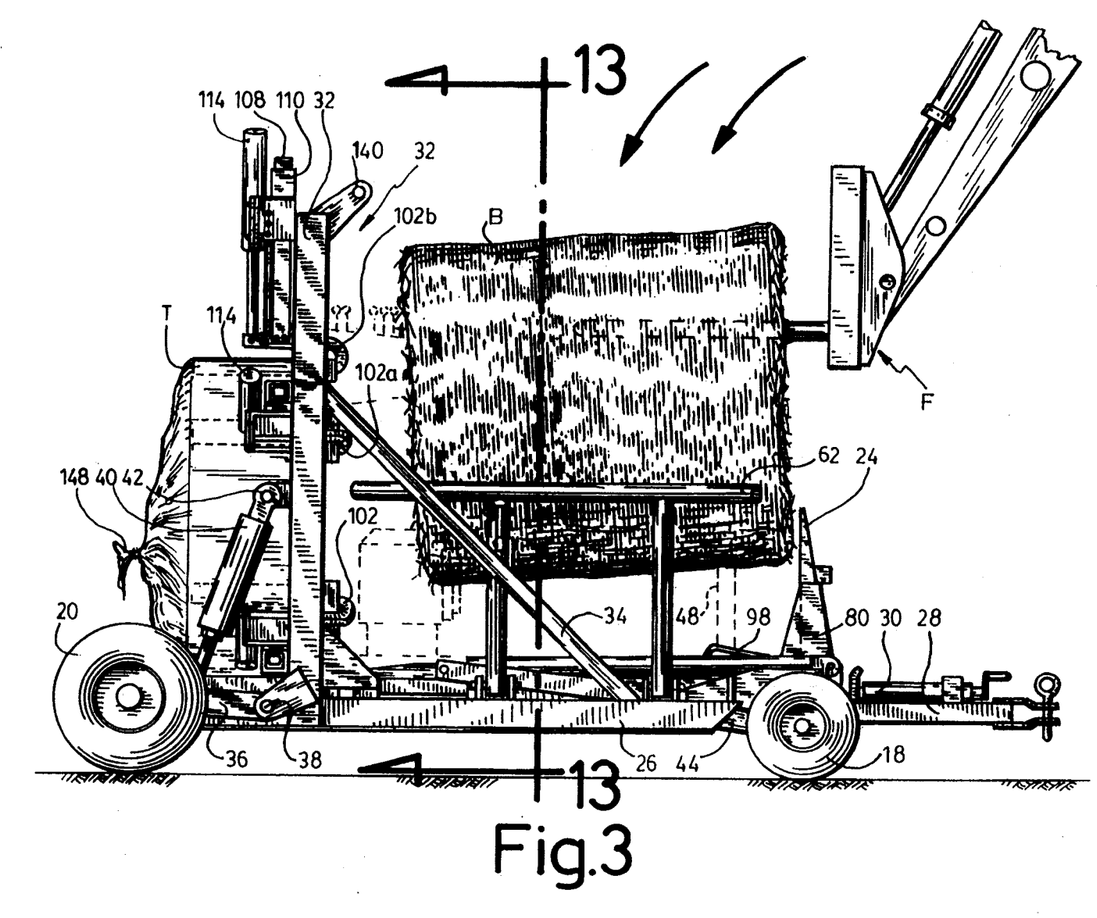
FIG. 3 is a side elevation of the apparatus and of a first bale to be loaded.

It is also known to provide a tubing which is stretchable, the tubing being stretched during bale loading and allowed to relax and tighten the loaded bales so as to diminish as much as possible the air content of the resulting bagging tube to thereby improve the quality of the eventual silage. A system using resilient, stretchable, flexible tubing is described in the international patent application No. PCT GB 9001820, published on Jun. 13, 1991 under international publication No. WO 91-07867. This application is entitled "SHEATHING APPARATUS" in the name of Ag Bag Corp. U.S.A. The apparatus described in this patent application requires the use of a farm tractor to move the same over the ground as shown in FIG. 3 and, moreover, the system for stretching the resilient tubing results in uneven stretching of the tube around its periphery and also cannot accomodate bales and tubes of different diameters.

OBJECTS OF THE INVENTION

The general object of the present invention is to provide a bale loading apparatus which will obviate the above-noted disadvantages.

A more specific object of the present invention is to provide a bale-loading vehicle which is completely autonomous and which automatically moves over the ground upon the sequential loading of bales into the flexible tube, whereby a minimum of operators are required for bale loading.

Another object of the present invention is to provide a bale-loading apparatus of the character described which can use plastic tubing which is highly resilient and stretchable.

Another object of the present invention is to provide an apparatus of the character described in which the resistance to forward movement of the vehicle caused upon successive dropping of the loaded bales on the ground can be increased to further compact the bales within the tube.

Another object of the invention is to provide a tube holding device which can stretch the tube uniformly around its periphery and with a minimum of friction on the tube.

SUMMARY OF THE INVENTION

There is provided an apparatus for loading bales into a flexible tube which comprises an elongated frame carried on the ground by four wheels. Bales are sequentially dropped on the frame in a loading position. A holding device is mounted on and upstands from the rear end of the frame and serves for holding tubing with at least an open ended portion taut to provide an open end of a size sufficient for insertion of a bale in said open ended portion, a bale pusher means successively push the loaded bales into the tubing and cause the same to drop on the ground at the rear of the frame. The bales on the ground react to cause forward movement of the vehicle upon the backward thrust exerted by the pusher means on the next bale being loaded. The pusher means are actuated by a power system which is completely mounted on the vehicle; this system preferably includes an internal combustion engine driving a hydraulic pump which actuates hydraulic rams arranged in a hydraulic circuit including a trip plate to cause the pusher means to automatically push and load successive bales into the tubing as they are placed onto the frame of the vehicle.

The vehicle has a skid plate on which it normally rides on the ground.

At the start of the loading operation, the vehicle wheels are lowered so as to decrease the resistance to advancing movement since the weight of the first bales on the ground is normally insufficient to produce forward vehicle movement while riding on the skid plate. However, after a second or third bale is loaded, the rear wheels are raised so that the vehicle now rides on the skid plate to increase resistance to forward movement thereby increasing bale compaction within the tubing. Preferably, the forward wheels are also adjustable in height to further increase the resistance of forward movement of the vehicle. Preferably, the wheel raising mechanism for the rear wheels includes hydraulic rams operated from the same power means.

The holding device includes an arch-shaped frame through which successive bales are pushed, a tube retainer plate fixed to the rear end of the elongated frame at the bottom of the arch-shaped frame, tube retaining hook members mounted on the arch-shaped frame for outward diverging linear movement and inward converging linear movement. An additional actuator means for each hook member to move the same inwardly and outwardly whereby a resilient plastic tube can be retained by the hook members and by the retainer plate and stretched to a greater cross-sectional area than in the relaxed condition of the tube. Preferably, the hook members are actuated by hydraulic rams operated by the same hydraulic pump mounted on the vehicle. Stop means are preferably provided to limit the outward movement of the individual hook members in accordance with the diameter of tubing being used which, in turn, depend on the diameter of the bales being loaded.

The stretchable tubing is stretched uniformly around its periphery so that a minimum of friction is exerted on the same by the outwardly moving hook members during stretching.

BRIEF DESCRIPTION OF THE DRAWINGS

In the drawings, like reference characters indicate like elements throughout.

DETAILED DESCRIPTION OF THE PREFERRED EMBODIMENT

Figure 1:
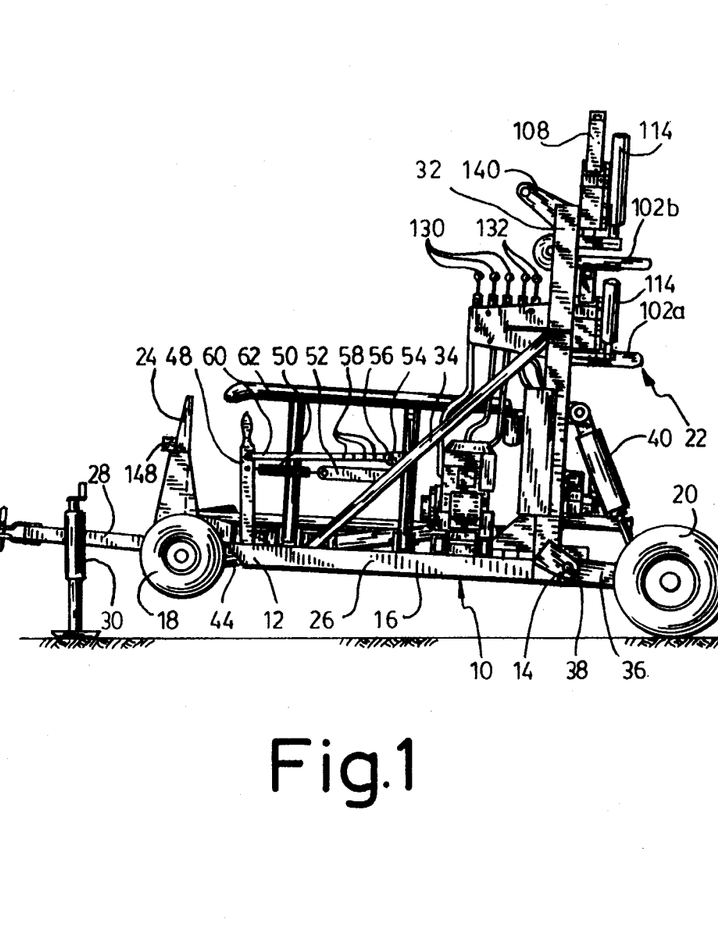
FIG. 1 is a side elevation of the apparatus in non-operative condition.
Figure 2:
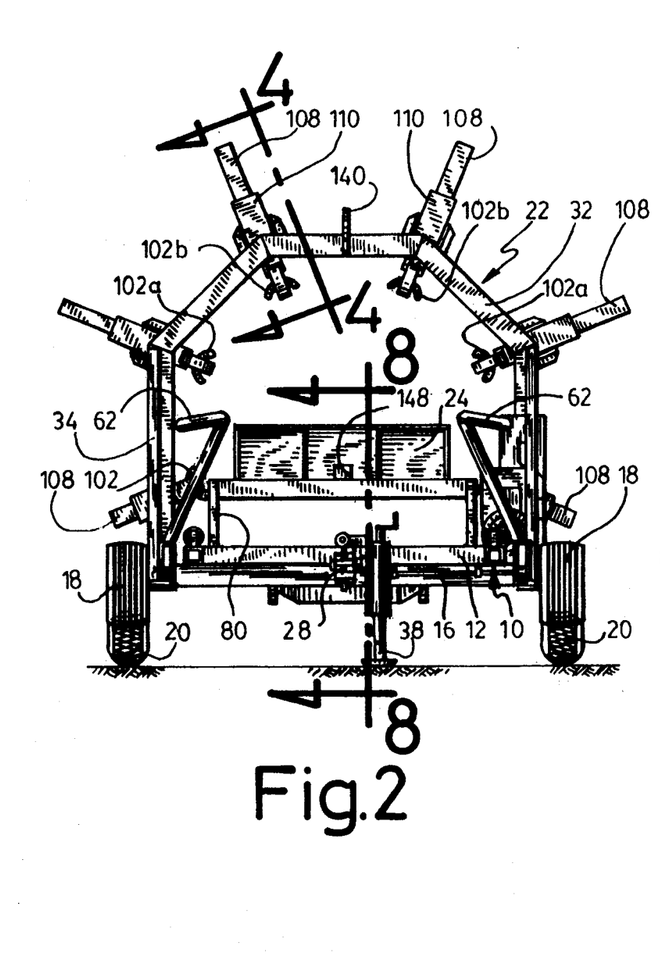
FIG. 2 is a front end view of the same.

The apparatus is generally shown in FIGS. 1 and 2 and includes an elongated frame 10 having a front end 12 and a rear end 14; a skid plate 16 is fixed to the underside of the frame 10; a pair of front idle wheels 18 and a pair of rear idle wheels 20 normally support the frame 10 and its skid plate 16 above ground; a flexible tubing holding device 22 is mounted on frame 10 and upstands from the same at the rear end 14; a pusher plate 24 is movable back and forth along the frame 10 and protrudes upwardly from the same.

In FIG. 1, the pusher plate 24 is in rest position, namely at its forward limit position, ready to push, rearwardly of the vehicle, a bale of hay or the like indicated as B in FIG. 3 which is deposited on frame 10 on an intermediate section 26 of frame 10 between the pusher plate 24 in its rest forward position and the holding device 22.

The bale B is being deposited by the spear assembly F of a farm tractor or the like (not shown).

A hitch bar 28 is fixed to frame 10 and protrudes forwardly of its front end 12. Hitch bar 28 can be attached to a towing vehicle to move the apparatus or vehicle from one work site to the other. When in rest position, the front portion of the vehicle can be lifted off the ground by a conventional manually operated jack 30 (see FIGS. 1 and 2) which, when not in use, can be pivoted to an inoperative position resting over the hitch bar 28 as shown in FIG. 3.

Holding device 22 comprises an arch-shaped frame 32 fixed to the rear end of the frame 10 and upstanding therefrom at substantially right angle. Braces 34 interconnect the frame 10 and arch-shaped frame 32 at both sides of the apparatus.

According to a feature of the invention, the rear wheels 20 can be raised or lowered with respect to the frame 10 and skid plate 16. Each rear wheel 20 is pivoted at the free end of a lever arm 36, the opposite end of which is pivoted at 38 at the bottom of each leg of the arch-shaped frame 32. A single acting hydraulic ram 40 is connected at one end to the lever arm 36 and at the other end at 42 to an intermediate portion of the arch-frame 32. There is a ram 40 for each wheel 20. Simultaneous extension of the two hydraulic rams 40 causes lowering of the wheels 20 to a ground engaging position as shown in FIGS. 1, 2, and 3, raising the skid plate 16 off the ground. The wheels can be raised with respect to the skid plate by the hydraulic rams 40 to a level above the skid plate as shown in FIG. 3e, whereby the adjacent portion of the skid plate 16 rests on the ground.

Preferably, the front idle wheels 18 are also mounted for up and down movement with respect to the frame 10 and skid plate 16; the axle of each front wheel 18 is carried by the free end of a lever arm 44, the rear end of which (see FIGS. 8 and 9) is fixed to a transverse tubular axle 46 which is common to the two arms 44, one on each side of the vehicle. A control lever 48 (see FIG. 1) is fixed to the tubular axle 46 to rotate the same one way or the other. A tension spring 50 is attached to control lever 48 and to a bracket 52 fixed to the corresponding adjacent brace 34 (see FIG. 1) to assist the operator when actuating the control lever 48 in a direction to raise the two front wheels 18. The level of the wheels can be adjusted by manually operating control lever 48 and then locking the same in adjusted position by inserting a locking pin 54 through registering holes made in a sleeve 56 fixed to brace 34 and any one of a plurality of holes 58 made in a bar 60 pivoted to the control lever 48.

Figures 3A, 3B, 3C, 3D, 3E:
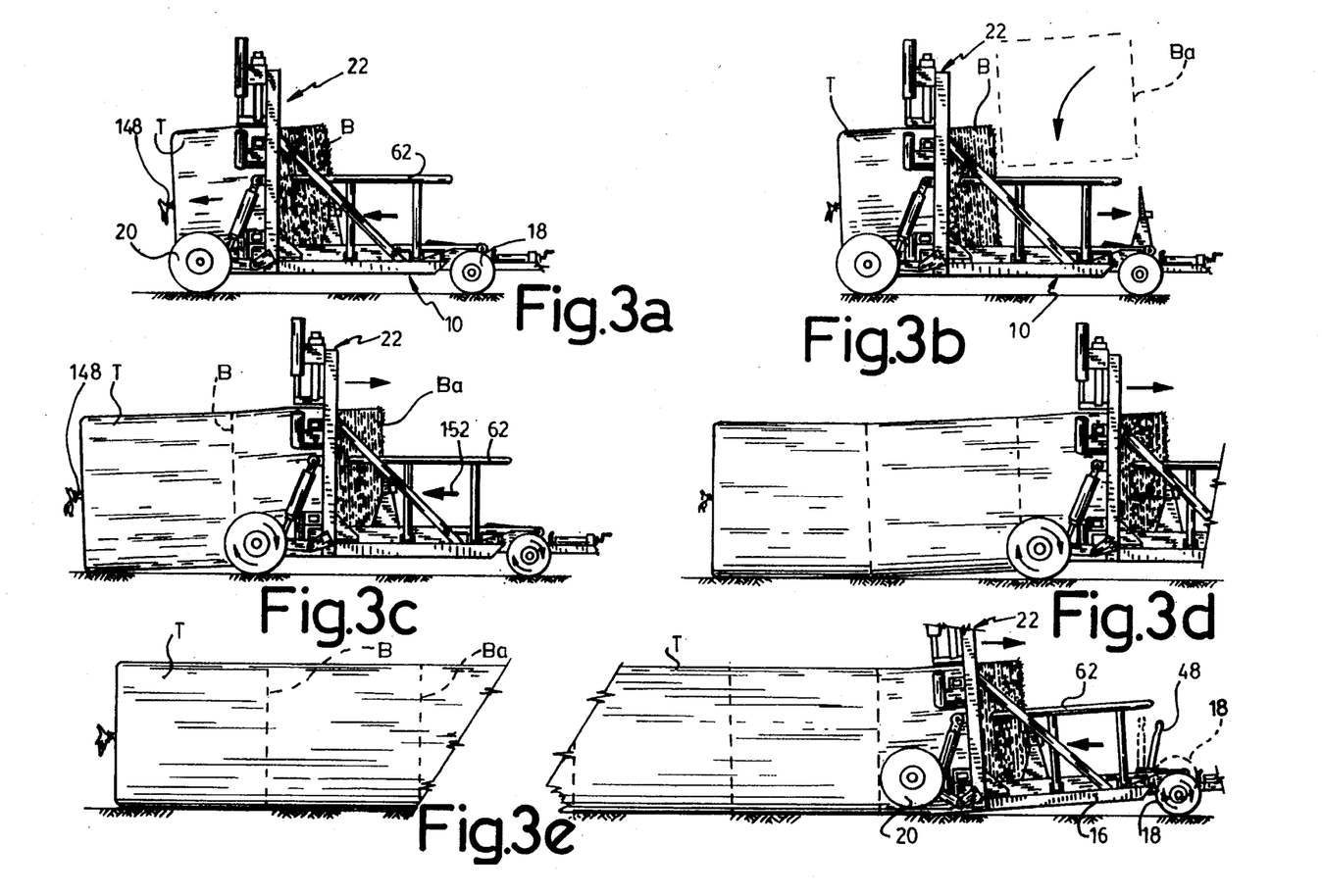
FIGS. 3a to 3e are side elevations similar to that of FIG. 3 showing the sequence of the bale loading operation.

As shown in dotted line in FIG. 3e, the front wheel 18 can be raised above the level of the skid plate 16 so that the front portion of the skid plate may rest on a support surface. When both sets of front and rear wheels are raised, the full extent of skid plate 16 rests on a support surface and entirely supports the apparatus which is convenient when the machine is transported on a road vehicle.

A pair of side fences 62 extend on both sides of the intermediate section 26 of frame 10 to laterally confine and guide a bale B deposited on the frame at its loading position. The fence 62 includes uprights 64 which are pivoted at their lower ends at 66 to the side of frame 10 so that the fences may be laterally adjusted in accordance with the diameter of the bales B being handled by manually adjusting turnbuckles 68 (see FIGS. 13 to 14) which interconnect each fence 62 with an adjacent brace 34 by pivotal connections 69 and 70.

Figure 9:
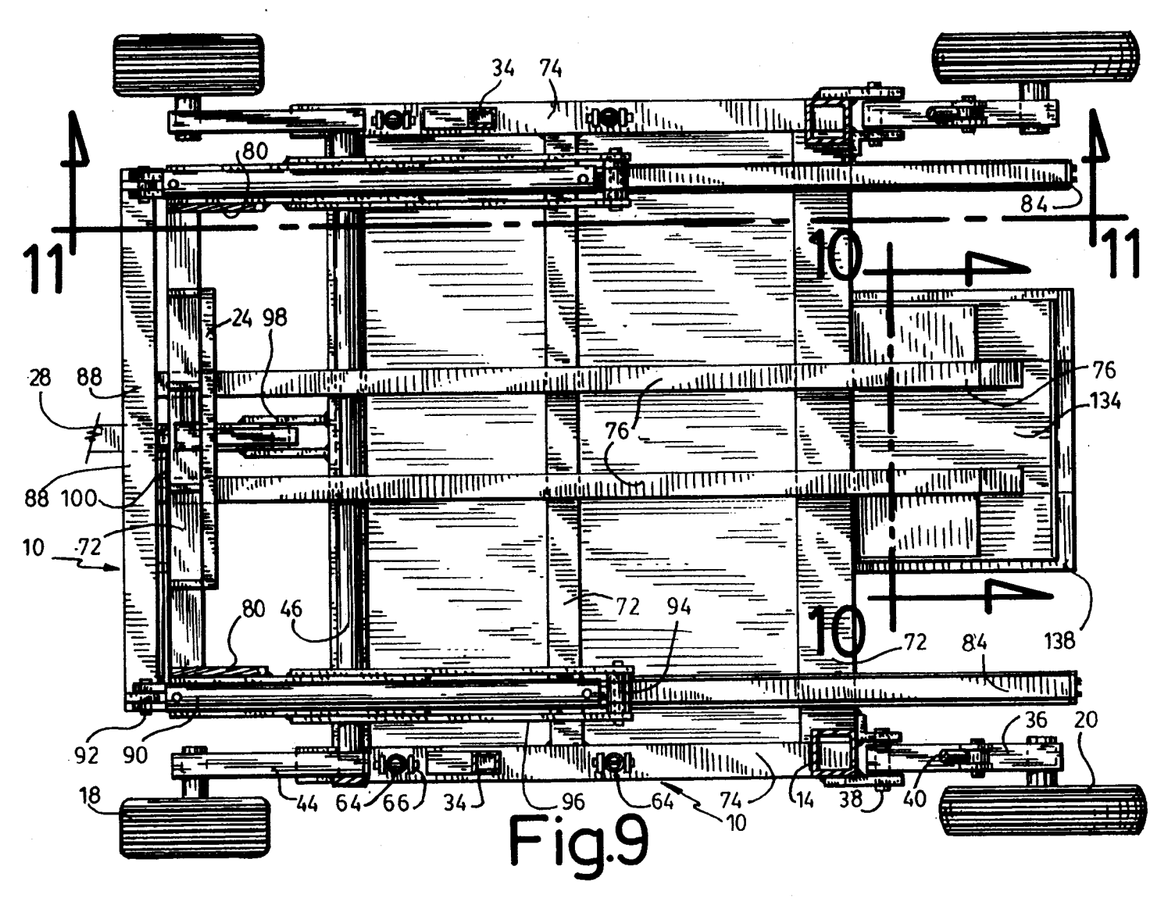
FIG. 9 is a plan section, taken along 9—9 of FIG. 8.
Figures 13, 14, 15:
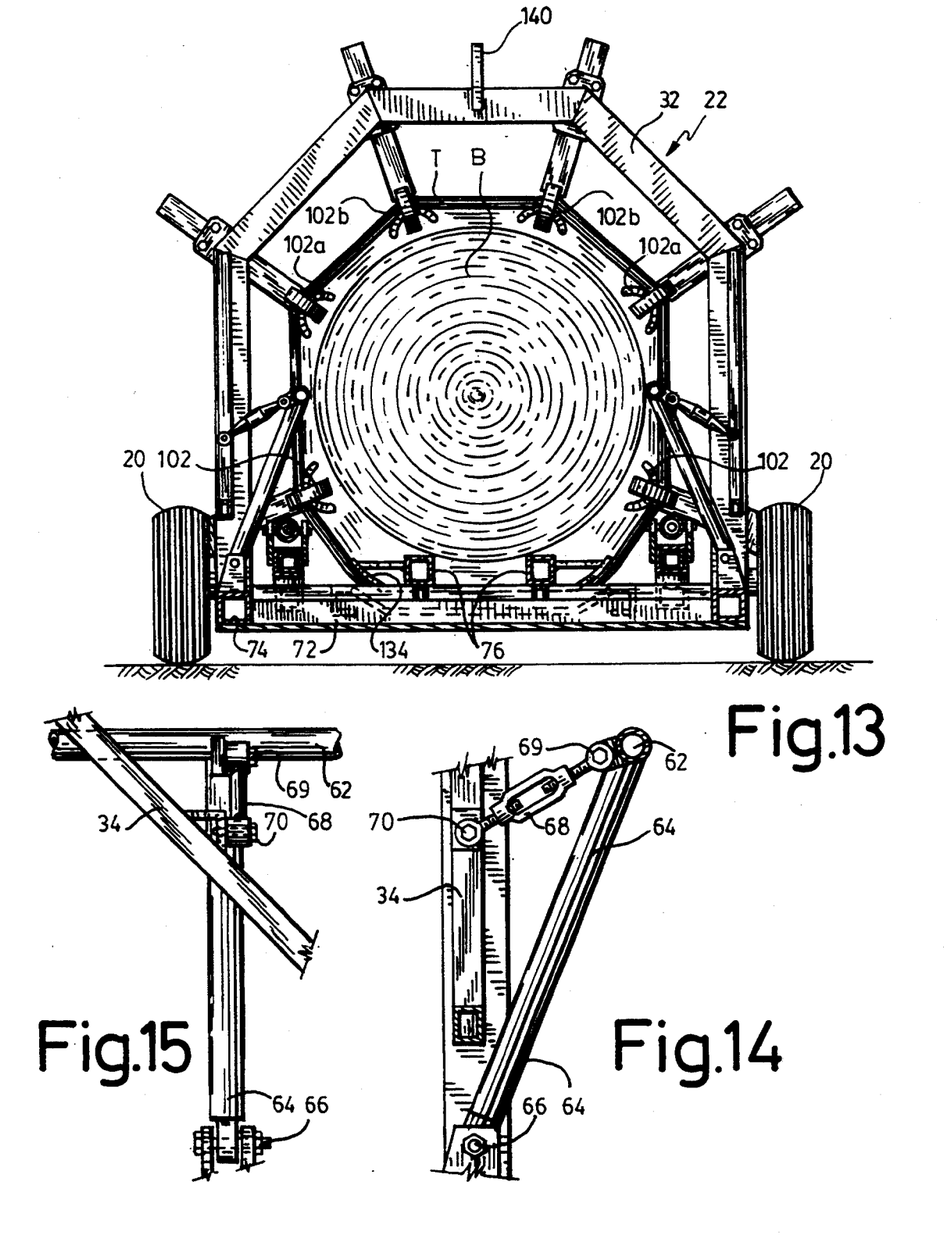
FIG. 13 is a vertical section looking toward the holding device and taken along line 13—13 of FIG. 3.
FIG. 14 is an enlarged view of the left hand bale retaining side fence shown in FIG. 13.
FIG. 15 is a partial side elevation of the side fence shown in FIG. 14.

As more particularly shown in FIGS. 9 and 13, frame 10 is made up of transverse beams 72 and of a pair of external longitudinal members 74 and of a pair of central longitudinal members 76. The central longitudinal members 76 serve as slides for the bale B when pushed by the pusher plate 24. The arch-shaped frame 32 has its legs directly secured to the external longitudinal members 74.

Figures 10, 11, 12:
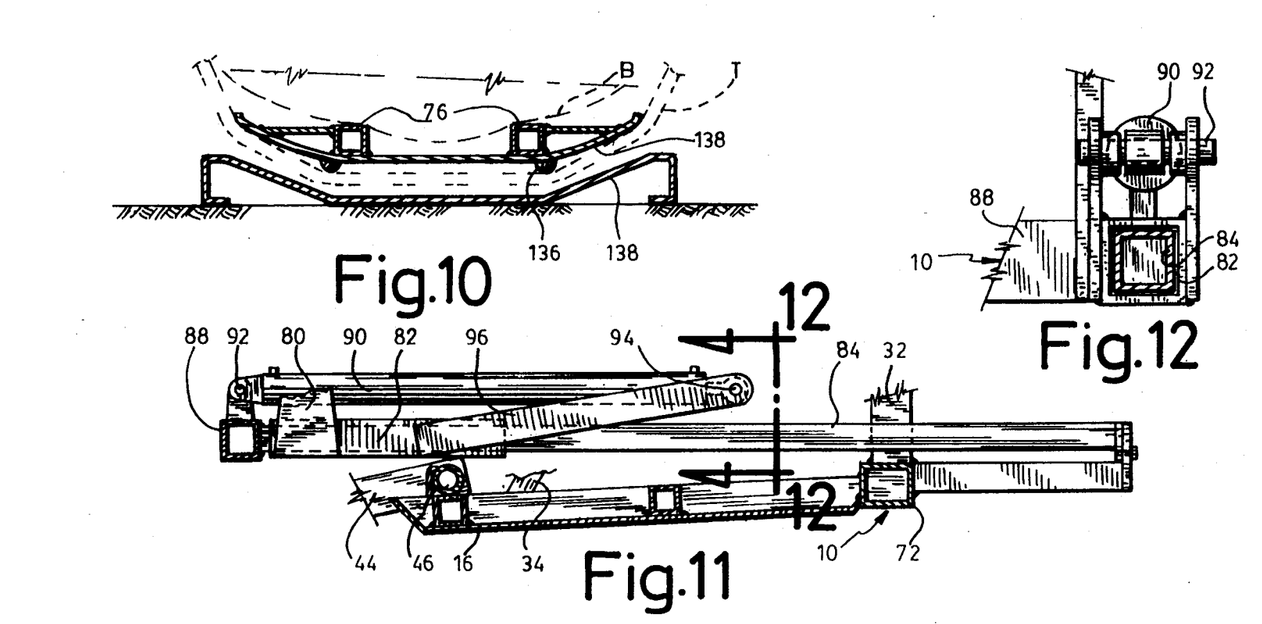
FIG. 10 is a vertical section, taken along line 10—10 of FIG. 9.
FIG. 11 is a partial longitudinal section, taken along line 11—11 of FIG. 9 and showing the pusher plate in the forward retracted position.
FIG. 12 is a partial section taken along line 12—12 of FIG. 11.
Figure 11A:
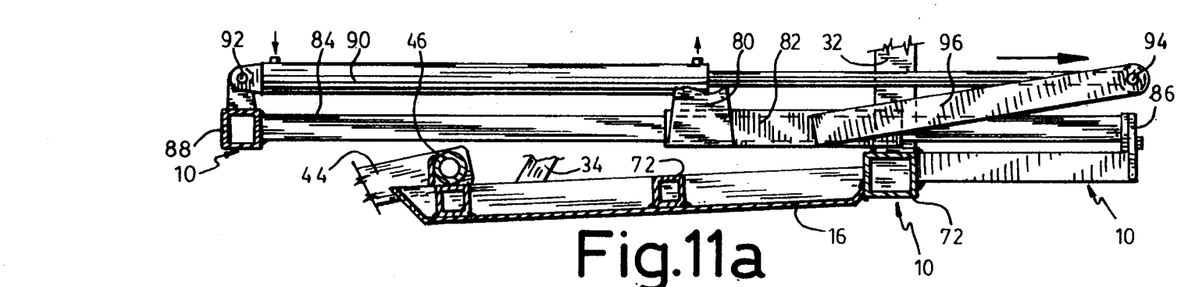
FIG. 11a is a view similar to that of FIG. 11 but showing the pusher plate in the rearward advanced position.

As shown in FIG. 2, pusher plate 24 extends transversely of frame 10, spaced above the same, being fixed, at its ends, to a pair of downwardly extending arms 80 which (see FIGS. 9, 11, 11a and 12) are each fixed to a sleeve 82 in slidable engagement around a guiding bar 84. The two guiding bars 84 are disposed on the outside of the central longitudinal members 76 to clear the bale resting in loading position on the central longitudinal members 76 and are only supported at their ends, namely at the rear end of the frame 10 by bracket plates 86 and at the front end of the frame 10 by a cross beam 88 which is part of frame 10. Therefore, as shown in FIGS. 11 and 11a, each sleeve 82 can slide along its guiding bar 84 from a front position (as shown in FIG. 11) to a back position (as shown in FIG. 11a). This movement is obtained by a double-acting hydraulic ram 90, one for each sleeve 82 which extends over and longitudinally of the respective guiding bar 84 and which is pivotally connected at 92 to the cross beam 88 and at 94 to the free end of an inclined arm 96 which is fixed to and extends rearwardly of sleeve 82. This arrangement permits to obtain a long enough stroke of the pusher plate 24 without having to use telescopic hydraulic cylinders for the rams 90.

The two rams 90 are operated simultaneously so that the pusher plate 24 remains parallel to itself, transverse to the frame 10 during its back and forth movement.

A trigger plate 98 (see FIGS. 8 and 9) is disposed between the two central longitudinal members 76 and protrudes just above said members 76 just rearwardly of the pusher plate 24 when the latter is in its front position. Trigger plate 98 is fixed at its forward end to a cross-rod 100 which is rotatably carried by the machine frame just rearwardly of transverse beam 88. When bale B is dropped onto the central longitudinal members 76 in loading position, it pivots the trigger plate 98 downwardly to start the reciprocating movement of the pusher plate 24 under the action of the double-acting hydraulic rams 90. Any known system (not shown) may be used to operate rams 90. For instance, the hydraulic circuit for rams 90 may include a rotary shut off valve, spring biased to normally closed position and a serially connected reversal valve responsive to a pressure surge at the end of a ram stroke. The rotary valve has a latch to keep it open. Upon pivoting downwardly, the trigger plate rotates the rotary valve to open the hydraulic circuit to extend rams 90. When the pusher plate reaches its rearward limit position, a pressure surge in rams 90 causes reversal of the reversing valve. The rams retract to their front limit position causing a pressure surge which produces reversal of the reversing valve. Valve reversal unlatches the shut off valve which returns to closed position.

Figure 4:
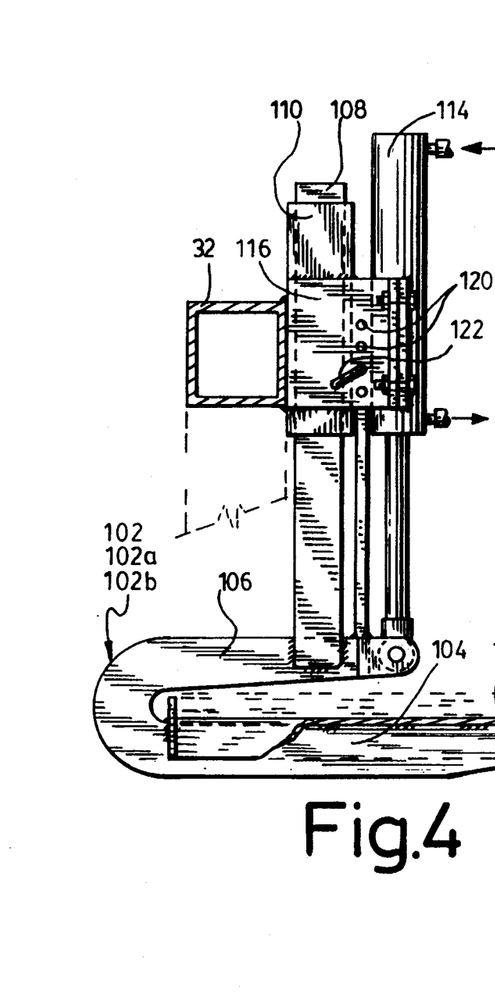
FIG. 4 is a cross-section, taken along line 4—4 of FIG. 2.
Figure 5:
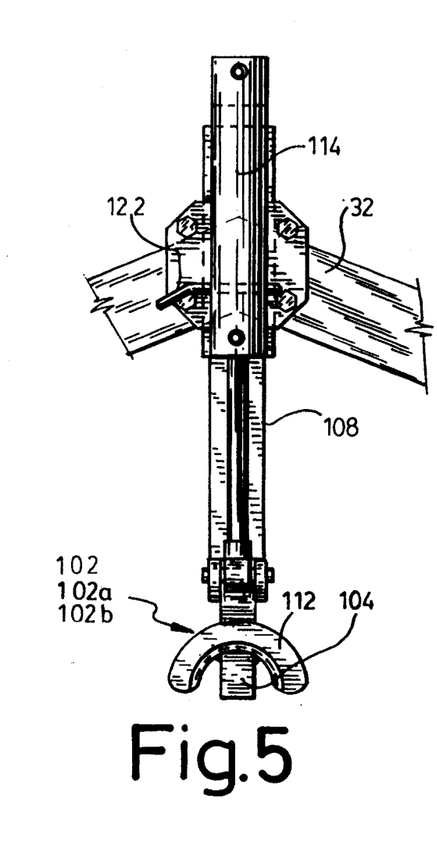
FIG. 5 is an elevation taken from the right of FIG. 4.
Figure 6:
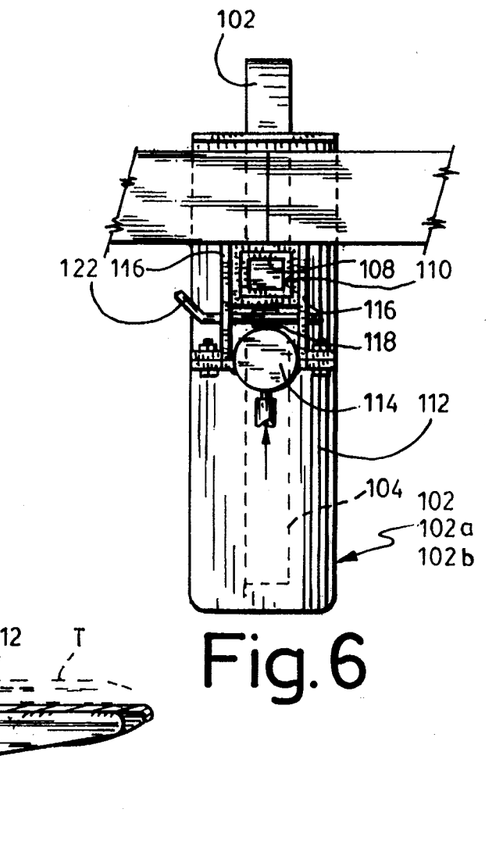
FIG. 6 is a top plan view of the hook member shown in FIG. 4.

Holding device 22 includes a plurality of hook members 102 which are mounted on the arch-shaped frame 32 for diverging outward linear movement and converging inward linear movement. The holding device is more particularly shown in FIGS. 2, 3, 4, 5, 6, 9, 10, and 13. Each hook member 102 is U-shaped (as shown in FIG. 4) including a tube retaining leg 104 and an outer leg 106 to which a support arm 108 is fixed and is directed transversely of the tube retaining leg 104. Support arm 108 is guided in a guiding sleeve 110 which is fixed to the arch-shaped frame 32; tube retaining leg 104 has a transversely convex tube engaging plate 112 on which a flexible tube T made of plastic and, preferably, resilient, stretchable plastic with a memory is adapted to be folded in accordion like manner in several pleats. A double-action hydraulic ram 114 is fixed parallel to arm 108 by means of bracket plates 116 which are secured to the sleeve 110 on both sides thereof and to the frame 32. The action of the hydraulic ram 114 substantially coincides with the resultant of the force exerted by the tube T on the hook member 102 during stretching of the tube T. Therefore, arm 108 is guided in sleeve 110 with a minimum of friction. Due to its convexity, tube engaging plate 112 exerts a minimum of friction on the tube T while it is being stretched.

A stop rod 118 is fixed to outer leg 106 intermediate support arm 108 and the piston rod of ram 114 and extends parallel to the same and is adapted to enter the space between the two bracket plates 116 which are provided with a series of registering holes 120 through which a stop pin 122 can be removably inserted to form an adjustable stop abutting stop rod 118 when the hook member 102 has reached the desired limit of its outward movement.

As clearly shown in FIGS. 2, 3, and 13, the hook members 102 are symmetrically arranged on each side of the vertical center line of the arch-shaped frame 32, therefore they form pairs of opposite hook members, a first pair being shown at 102, a second pair at 102a and a third pair at 102b. The hydraulic rams 114 of each pair are connected in parallel so that the hook members 102 of the first pair move outwardly or inwardly simultaneously and the same holds true for the second and third pairs of hook members. However, each pair of hook members has its own control lever 130 (see FIG. 1) for actuating a corresponding valve so that the hook members of each pair may be operated independently of the hook members of the other pairs.

FIG. 1 shows two additional control levers 132, each actuating a control valve for one of the hydraulic rams 40 for raising and lowering the rear wheel 20.

The tube holding device 22 further includes a tube retaining plate 134 which is transversely curved and is fixed to the underside of the longitudinal central frame members 76 and which are provided at their external face with a pair of longitudinal ridges 136 which engage the stretchable tube T so that during stretching there will be a minimum of friction exerted on the tube by the retaining plate 134. The latter is protected together with the tube T by a skid plate extension 138 as shown in FIGS. 9 and 10.

The tube receiving space between the two legs of each hook together with the tube receiving space between the plate 134 and skid plate extension 138 open rearwardly of the machine so that the tube which is folded in pleats around the hook members 102 and the plate 134 will gradually unfold during loading of successive bales within the tube.

A perforated suspension arm 140 (see FIG. 3) is fixed to the top of the arch-shaped frame 32 at the machine center of gravity and serves to lift the machine off the ground by a suitable hoist whenever desired.

Figures 7, 8:
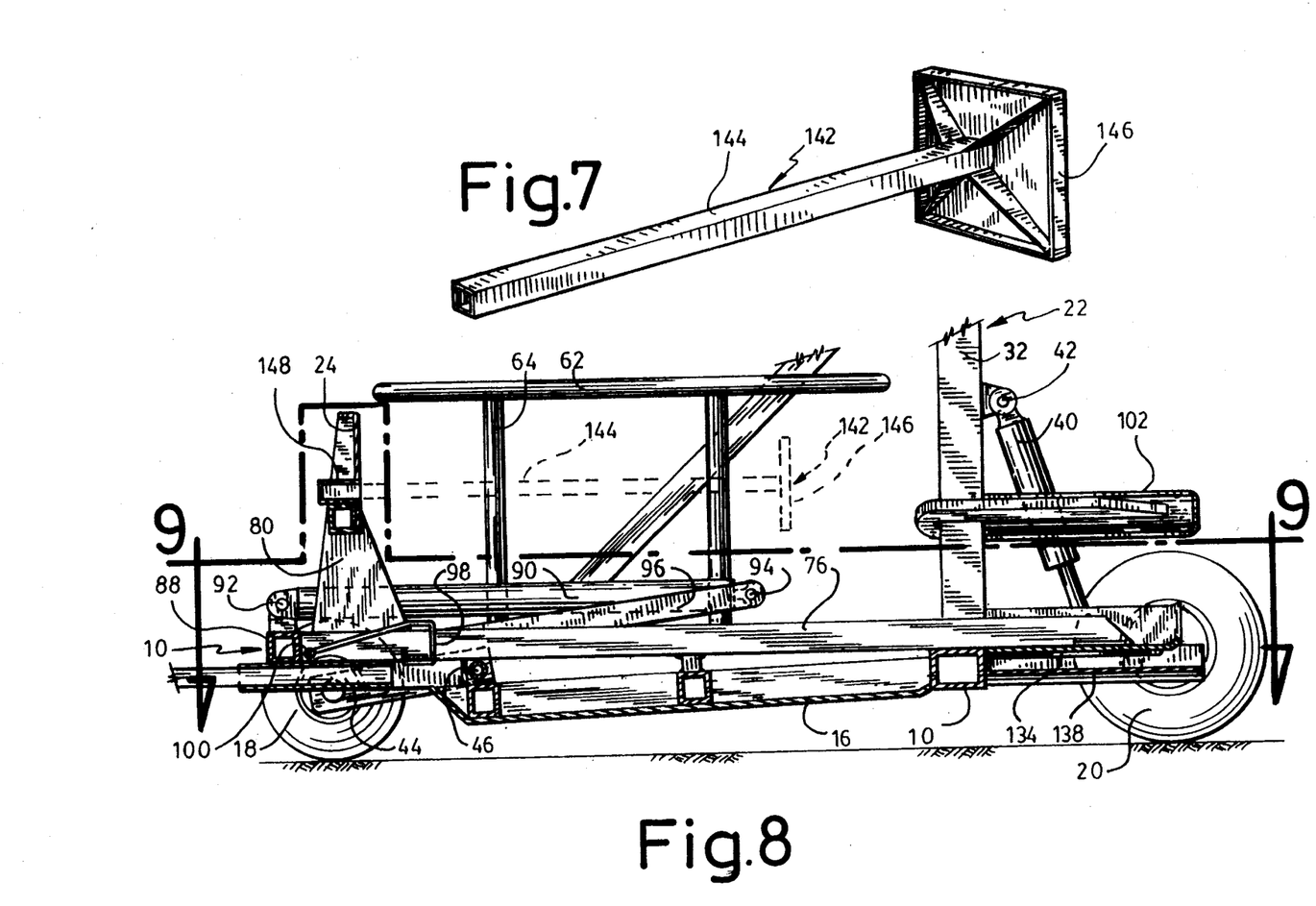
FIG. 7 is a perspective view of the pusher plate extension used to load the last bale in a given tubing.
FIG. 8 is a partial longitudinal section, taken along line 8—8 of FIG. 2.

FIG. 7 shows a bale pusher extension 142 which includes a stem 144 and a head plate 146 at one end of the stem. The other end of the stem is adapted to be inserted in a blind cavity 148 (see FIGS. 8 and 2) which serves as a support to hold the stem horizontal and projecting rearwardly of pusher plate 24. This pusher plate extension 142 serves to push the last bale in a given tube.

The apparatus operates as follows:

The stop pins 122 are first inserted in the desired holes 120 to determine the maximum limit outward position of the hook members 102 in accordance with the size of the tube T being used and which, in turn, depends on the size of the bales B being handled.

The apparatus can be arranged so as to accomodate tubes of a different size to be used in conjunction with bales of another range of diameters.

For this purpose, each of the six hook members 102, including their guiding sleeve 110, are adjustably mounted on arch-shaped frame 12 for manual positioning in an inward or an outward position. Each sleeve 110 is mounted in a guide rail fixed to frame 32 and is positioned by a pin and holes system such as the system of pin 122 and holes 120.

The hook members 102, 102a, 102b are first caused to reach their inward limit position under the control of the three control levers 130. A folded tube T is positioned on the hook members 102 and tube retaining plate 134, the tube being already folded in accordion pleats. The control levers 130 are then operated simultaneously to cause outward movement of the hook members 102, 102a, 102b until the tube T is taut. The outer pleat of the tube is then pulled out and the end of the tube is attached, as shown at 148 in FIG. 3, to close the end of the tube. The levers 130 are again operated to cause outward movement of the hook members 102 until the open ended portion of the tube, together with the whole tube, is stretched to the desired limit position as provided by the stop pins 122. The three control levers 130 are first operated simultaneously and, subsequently, individually to impart to the tube the desired cross-sectional shape. The tube should be stretched only when the machine is to be used, otherwise the tube may lose some of its memory if kept stretched for too long a period of time. When bale loading has to be stopped, the tube should be brought down to a moderate tension.

Once the bale B is dropped in loading position by the spear assembly F, the trigger plate 98 is moved down and a first bale is pushed within the open-ended portion of the tube T as shown in FIG. 3A. At this stage, the wheels 18 and 20 are in lowered position to raise skid plate 16 off the ground. The pusher plate 24 automatically returns to its forward limit position and stops so that a second bale Ba can be dropped onto the apparatus in loading position to again depress the trigger plate 98 (see FIGS. 3B and 3C). The second bale Ba is inserted within the tube and successively for the other bales, the tube unfolding from the hook members and retaining plate during all that time.

As soon as the first bale B is dropped off the machine on the ground it causes the whole apparatus to move forwardly as indicated by arrow 150 as a reaction to the rearward force exerted by the pusher plate over the second bale Ba in accordance with arrow 152. Therefore, the machine moves forwardly at each successive loading of a bale as shown in FIG. 3d and 3e. When sufficient bales rest on the ground, they provide sufficient resistance and then the rear wheels 20 may be raised completely as shown in FIG. 3e so that the rear end of the skid plate will rest on the ground. The level of the front wheels 18 can also be adjusted depending on the type of ground on which the machine moves and so that the skid plate which now slides on the ground, offers a maximum resistance to thereby cause good compaction of the bales one against the other within the tube. However, in practice, the front of the skid plate is not lowered less than 2" above ground level even on hard ground. Stretchable, resilient tube T relaxes around the bales when released from the hook members, the result is that the bales are stored with a minimum of air trapped within the tube for optimum conversion of the vegetable material into silage.

When the tube has been nearly completely unfolded and the last bale has been partially inserted into the tube, and after the pusher plate has returned to its forward limit position, the pusher plate extension 142 is inserted within cavity 148 as shown in FIG. 8 and the pusher plate is caused to move rearwardly to push the last bale within the tube and to release the tube from the hook members and retaining plate. The rear end is then tied in the same manner as the tie 148.

We claim:

1. An apparatus for loading bales into a flexible tubing comprising an elongated frame having a rear end and a front end and an intermediate portion for receiving a bale in a loading position, a holding device mounted on, and upstanding from said frame at said rear end, for holding tubing with at least an open ended portion taut to provide an open end of a size sufficient for insertion of a bale in said open ended portion, bale pusher means mounted on, and upstanding from said frame, guiding means to guide said bale pusher means for back and forth movement longitudinally of said frame between a forward position at the front end of said frame and a back position adjacent said holding device, power means to reciprocate said bale pusher means between said forward and back position through one cycle, sensor means on said frame for detecting the presence of a bale in said loading position, while said pusher means is in forward position and to cause said power means to push a bale in said loading position and insert the same in said open ended portion of said tubing held on said holding device, an autonomous power supply carried by said frame and connected to said power means, a front pair and a back pair of ground engaging wheels carried by said frame and supporting said frame above ground whereby bales successively pushed within said tubing by said pusher means drop on the ground off the rear end of said elongated frame and react to the backward thrust exerted by said bale pusher means on a successive bale in said loading position to cause forward movement of said apparatus on the ground; and     a skid plate fixed to said frame underneath the same and extending between said front and rear pair of wheels and means to raise and lower said rear wheels relative to said frame and skid plate between a raised position wherein said skid plate rests on the ground and a lowered position wherein said skid plate is raised off the ground whereby the resistance to the forward movement of said apparatus is increased when said skid plate slides on the ground with said rear wheels in raised position, the increased resistance producing increased compaction of bales successively pushed within said tubing.

2. An apparatus as defined in claim 1, wherein said skid plate is downwardly inclined from back to front relative to said frame.

3. An apparatus as defined in claim 1, wherein said means to raise and lower said rear wheels include levers pivoted to said frame at one end for up and down movement, said rear wheels having axles carried by the free end of said levers, and hydraulic rams pivotally connected to said frame and levers and actuated by said autonomous power supply.

4. An apparatus as defined in claim 1, wherein
said holding device includes an arch-shaped frame through which successive bales are pushed, a tube retainer plate fixed to the rear end of said elongated frame at the bottom of said arch-shaped frame, tube retaining hook members mounted on said arch-shaped frame for outward diverging linear movement and inward converging linear movement relative to said arch-shaped frame and additional power means for each hook member to move said hook member outwardly and inwardly whereby a resilient plastic tube can be retained by said hook members and said retainer plate and stretched by the outward movement of said hook members to a greater cross-sectional area than in the relaxed condition of said tube, said additional power means being a double-acting hydraulic ram actuated by said autonomous power supply;

each hook member being U-shaped with two spaced legs, one leg serving to retain a tube in folded position, an arm fixed to and laterally protruding from the other leg, a guide sleeve fixed to said arch-shaped frame and in which said arm is slidable, said double-acting hydraulic ram mounted side by side with said arm and guide sleeve and connected to said hook member and to said guide sleeve.

5. An apparatus as defined in claim 2, further including means to raise and lower said front wheels relative to said frame between a raised position wherein said skid plate rests on the ground and a lowered position wherein said skid plate is raised off the ground.

6. An apparatus as defined in claim 3, wherein said skid plate is downwardly inclined from back to front relative to said frame and further including means to raise and lower said front wheels relative to said frame and skid plate between a raised position wherein the front end of said skid plate rests on a support surface and a lowered position wherein the front end of said skid plate is raised off the ground.

7. An apparatus as defined in claim 4, wherein said double acting hydraulic ram acts on said hook member generally centrally of said one leg.

8. An apparatus as defined in claim 4, further including an adjustable stop for each hook member to adjustably limit its outward stroke.

9. An apparatus as defined in claim 4, wherein said one leg of each hook member has a transversely curved and convex tube engaging outer surface.

10. An apparatus as defined in claim 7, wherein said hook members are symmetrically disposed in pairs on each side of said arch-shaped frame and the hook members of any given pair operate simultaneously and any one pair of such hook members operate independently of the other pairs.

11. An apparatus as defined in claim 9, wherein said retainer plate has an outer face from which tube engaging ridges protrude.

12. In an apparatus for loading bales into a resilient flexible plastic tubing and of the type including an elongated frame for receiving a bale in a loading position, a holding device mounted on and upstanding from said frame for holding said tubing with at least an open ended portion taut to provide an open end of a size sufficient for insertion of a bale in said open ended portion and bale pusher means for successively pushing bales in loaded position into said open ended portion of said tube, wherein said holding device comprises an arch-shaped frame through which successive bales are pushed, a tube retainer plate fixed to said elongated frame at the bottom of said arch-shaped frame, tube retaining hook members mounted on said arch-shaped frame for outward diverging linear movement and inward converging linear movement relative to said arch-shaped frame and power means for each hook member to move said hook member outwardly and inwardly whereby a resilient plastic tubing can be retained by said hook members and said retainer plate and stretched by the outward movement of said hook members to a greater cross-sectional area than in the relaxed condition of the tube; said power means being a double-acting hydraulic ram;

wherein each hook member is U-shaped with two spaced legs, with one leg serving to, retain a tube in folded position, an arm fixed to and laterally protruding from the other leg, a guide sleeve fixed to said arch-shaped frame in which said arm is slidable, said double-acting hydraulic ram mounted side by side with said arm and guide sleeve and connected to said hook member and to said guide sleeve.

13. In an apparatus as defined in claim 12, wherein said double-acting hydraulic ram acts on said hook member generally centrally of said one leg.

14. In an apparatus as defined claim 12, further including an adjustable stop for each hook member to adjustably limit its outward stroke.

15. In an apparatus as defined in claim 12, wherein said one leg of each hook member has a transversely curved and convex tube engaging outer surface.

16. In an apparatus as defined in claim 13, wherein said hook members are symmetrically disposed in pairs on each side of said arch-shaped frame and the hook members of any given pair operate simultaneously and any one pair of such hook members operate independently of the other pairs.

17. In an apparatus as defined in claim 16, wherein said retainer plate has an outer face from which tube engaging ridges protrude.

* * * * *